US009025251B2

(12) United States Patent
Dunn et al.

(10) Patent No.: US 9,025,251 B2

(45) Date of Patent: May 5, 2015

(54) OPTICALLY VARIABLE DEVICES, SECURITY DEVICE AND ARTICLE EMPLOYING SAME, AND ASSOCIATED METHOD OF CREATING SAME

(75) Inventors: Paul Dunn, Leicestershire (GB); Robert Edward Renton, Lincolnshire (GB); Donald William Tomkins, Lancaster, PA (US)

(73) Assignee: Opsec Security Group, Inc., Denver, CO (US)

(*) Notice: Subject to any disclaimer, the term of this patent is extended or adjusted under 35 U.S.C. 154(b) by 200 days.

(21) Appl. No.: 12/964,897

(22) Filed: Dec. 10, 2010

(65) Prior Publication Data

US 2011/0317271 A1 Dec. 29, 2011

Related U.S. Application Data

(60) Provisional application No. 61/285,834, filed on Dec. 11, 2009.

(51) Int. Cl.

| | |
|---|---|
| ***G02B 27/10*** | (2006.01) |
| ***G07D 7/00*** | (2006.01) |
| ***G07D 7/12*** | (2006.01) |

(52) U.S. Cl.

CPC ............ *G07D 7/0006* (2013.01); *G07D 7/0013* (2013.01); *G07D 7/124* (2013.01)

(58) Field of Classification Search

CPC .. G02B 27/2214; G02B 27/22; G06T 3/4038; G09G 3/003; G09G 5/377

USPC .................................................. 359/619–626

See application file for complete search history.

(56) References Cited

U.S. PATENT DOCUMENTS

| | | | | |
|---|---|---|---|---|
| 4,758,296 | A | 7/1988 | McGrew | |
| 4,765,656 | A | 8/1988 | Becker et al. | |
| 5,712,731 | A | 1/1998 | Drinkwater et al. | |
| 5,972,546 | A * | 10/1999 | Bjelkhagen | 283/112 |
| 6,288,842 | B1 * | 9/2001 | Florczak et al. | 359/619 |
| 7,468,842 | B2 | 12/2008 | Steenblik et al. | |
| 7,820,282 | B2 * | 10/2010 | Haas et al. | 428/315.7 |
| 8,257,819 | B2 * | 9/2012 | Tompkin et al. | 428/195.1 |
| 2007/0058260 | A1 * | 3/2007 | Steenblik et al. | 359/626 |
| 2008/0037131 | A1 | 2/2008 | Steenblik et al. | |
| 2008/0182084 | A1 * | 7/2008 | Tompkin et al. | 428/195.1 |
| 2008/0212193 | A1 * | 9/2008 | Steenblik et al. | 359/619 |
| 2011/0212387 | A1 * | 9/2011 | Hansen et al. | 430/2 |

FOREIGN PATENT DOCUMENTS

| | | |
|---|---|---|
| WO | WO 2005106601 A2 | 11/2005 |
| WO | WO 2007087984 A1 | 8/2007 |
| WO | WO 2007149692 | 12/2007 |

OTHER PUBLICATIONS

International Extended European Search Report issued Jan. 30, 2012 for European Patent Appl. No. 10015655.3.

* cited by examiner

*Primary Examiner* — Alicia M Harrington

(74) *Attorney, Agent, or Firm* — Eckert Seamans Cherin & Mellot, LLC; Grant E. Coffield; John P. Powers

(57) ABSTRACT

An optically variable device ("OVD") with an integral image system that includes a focusing element and an array of micro-objects which, when viewed through the focusing element, changes in appearance depending on the relative location from which the OVD is observed. A security device including the OVD and methods for creating the OVD are also disclosed.

12 Claims, 8 Drawing Sheets

OPTICALLY VARIABLE DEVICES, SECURITY DEVICE AND ARTICLE EMPLOYING SAME, AND ASSOCIATED METHOD OF CREATING SAME

RELATED APPLICATION

This application claims the benefit of Provisional Application Ser. No. 61/285,834, filed on Dec. 11, 2009 and entitled, "OPTICALLY VARIABLE DEVICES".

BACKGROUND

1. Field

The disclosed concept relates generally to optically variable devices (OVD's) and, more particularly, to OVD's with integral imaging systems comprising an array of focusing elements and a corresponding array of micro-objects that, when viewed through the lens array, change in appearance depending on the relative location from which the OVD is observed. The disclosed concept also relates to security devices that comprise such OVD's, articles that employ such security devices, and methods for creating such OVD's.

2. Description of Related Art

An optically variable device (OVD) is a visual device that creates a change or shift in appearance, such as, for example and without limitation, a change in color, when observed from different relative observation points. The evolution of the OVD as a security device stems largely from the search for a mechanism to resist counterfeiting of certain articles and products, or alternatively to render such copying obvious. For example, and without limitation, paper money, banknotes, certificates, security labels, product hang tags, drivers' licenses, ID cards, and credit cards, among other things, frequently employ one or more OVD's to resist counterfeiting or to verify authenticity.

A counterfeiting deterrent employed in some OVD's involves the use of one or more images that exhibit optical effects which cannot be reproduced using traditional printing and/or photocopying processes. In some instances, the images comprise holograms wherein when the OVD is viewed from a predetermined location, an optical effect results, such as, for example and without limitation, movement of the image. However, additional unique effects are continually needed to stay ahead of the counterfeiters' ability to access or simulate new imaging technologies. Accordingly, other security mechanisms having image-related optical effects have evolved over time.

One such optical effect is to exhibit at least one magnified version of an object or objects based upon the concept of moiré magnification, a phenomenon that occurs whenever an array of lenses is used to view an array of identical objects or elements of identical objects situated at the focal point of the lenses, the two arrays having approximately the same pitch. Moiré magnification is well known in the art and is related to the generation of integral images and to integral photography. As the lens array is aligned with the object array, a moiré pattern is observed in which each moiré fringe consists of a magnified image of the repeat element of the object array. As the arrays are rotated with respect to each other, the magnification and orientation of the image changes.

Typically, known OVD moiré magnification methods involve the steps of generating a plurality of micro-objects, selectively arranging the micro-objects, and providing an overlying layer of correspondingly arranged micro-focusing elements. The focusing elements are usually spherical or cylindrical lenses. Thus, such OVDs generally comprise a top lens layer, an intermediate substrate, and a bottom print or object layer which contains the micro-objects that are to be magnified or otherwise altered when viewed through the lenses. The micro-object layer typically comprises printed artwork. Conventional print technology limits the size of individual printed elements, which means that lens diameters of about 50-250 microns are the smallest that can practically be used in this configuration using conventional printing techniques. Using the lens types mentioned above at these diameters requires focal lengths of similar magnitudes (e.g., about 50-250 microns) in order to achieve adequate optical performance. Accordingly, OVD's having this configuration are too thick for many applications where a thinner security article is desired.

U.S. Pat. No. 5,712,731 discloses an OVD comprising an array of substantially spherical lenses having diameters in the range of 50-250 microns, and an associated array of printed micro-images. The lenses have diameters of 50-250 microns and typical focal lengths of 200 microns. The total thickness of the OVD, which depends primarily on the focal length, is about 250-450 microns.

Such a thickness is, however, not conducive for use with certain articles such as, for example and without limitation, banknotes, checks, security labels and certificates.

U.S. Pat. No. 7,468,842 discloses an integral imaging system having micro-objects formed by microstructured physical reliefs and a thickness of less than 50 microns. A physical relief, standing alone, is difficult to observe because there is no visual contrast between the high and low areas. This patent discloses techniques to create visual contrast in micro-objects formed from microstructured physical reliefs. For example, recesses in the reliefs can be coated with an opaque or colored material, or the reliefs can form optical structures that reflect or absorb light in particular regions.

There is still a need, however, for very thin OVD's having optical effects that are more sophisticated and provide a clear visual differentiation from existing optical security features and moiré magnification methods, and are hence more difficult to counterfeit, and for methods of making the same.

SUMMARY

These needs and others are met by embodiments of the disclosed concept, which are directed to an optically variable device comprising an array of focusing elements combined with a co-planar data-bearing volume containing visual data elements, wherein the focusing array provides a magnified view of said data elements.

Generally, the OVD comprises a substrate including a first surface and a second surface, a volume disposed on the first surface which contains a plurality of visual data elements or objects within the volume, and an array of focusing elements or lenses disposed on the second surface. The optical geometry is arranged so that when the OVD is observed from a predetermined relative point, the focusing array being disposed between the observer and the object array, at least one magnified visual representation of at least one of the data elements is observed.

In one configuration the focusing array and the object array are manufactured on separate substrates and permanently combined (i.e., laminated), or manufactured on opposite sides of the same substrate. In this configuration the entire OVD is affixed to an article as an overt anti-counterfeit device.

In another configuration the object array is manufactured on a substrate with the corresponding focusing array manufactured on a separate substrate. The object array is affixed to an article subject to counterfeiting as a covert security device. Without the focusing array, the data elements are not visible. To confirm the authenticity of the article, the user places the focusing array against the object array, completing the optical effect and revealing a magnified image of the data elements. In another version of this configuration the focusing array, comprising reflective magnifiers, is affixed to the article. To confirm the authenticity of the article, the user places the object array against the focusing array, revealing a magnified image of the data elements.

The object array may comprise a plurality of individual data elements selectively organized within an object layer, and may be comprised of any elements that form a visible image within a volume. For example, and without limitation, the data elements may be created by the effects of interference of light waves, including techniques such as a volume hologram, Lippmann photograph, multi-layer optical interference film, etalon structure, layer of liquid crystal material, color-effect flakes or inks disposed within a substrate, or combinations thereof. Such an object array is fundamentally different from the prior art wherein the object elements are either printed on the surface of a substrate or embossed into a substrate to form a recess or physical relief.

The focusing array may comprise a plurality of refractive, diffractive, or reflective elements selectively organized into a focusing layer wherein the elements of the focusing layer are structured to refract, diffract, or reflect light at different wavelengths and/or at different focal lengths depending upon the predetermined relative observation point from which the OVD is to be viewed. The focusing elements may also be reflecting magnifiers. The focusing elements may be disposed in a linear or circular pattern or combinations of patterns, and may include elements having an altered shape or profile so as to induce specific optical advantages or effects. In addition to the at least one magnified version of the data elements, the focusing elements may be structured to impart (by themselves or in combination with the data element structure) one or more additional optical effects. Such additional optical effects may be selected from the group consisting of a change in observed color, changes in contrast relating to the angles of illumination and observation, a movement or animation of the observed visual representation of the data elements, a change in the size or shape of the observed visual representation of the data elements, a change in the polarization properties (which may be linear or circular in form) of the observed visual representation, and a transformation of the observed visual representation of the data elements into a second or multiple different images or optical effects.

The focusing array may be coupled to the substrate, for example, by an adhesive or by embossing, casting, or injection molding into or onto the substrate, or cut into the surface of the substrate, for example, by a laser. The focusing array may be formed directly into the surface of the data-bearing volume, for example, by embossing or molding. The focusing array may be, but need not necessarily be, removable from the object array.

The OVD may further comprise at least one additional layer selected from the group consisting of a metallic layer, a partially transparent and partially reflective layer, a reflective layer, a protective layer, and an additional substrate. The protective layer may overlay at least one of the focusing elements, at least one of the data elements, and at least one of the substrates.

A security device comprising the foregoing OVD, an article comprising such a security device, and a method of creating such OVD's are also disclosed.

DESCRIPTION OF THE PREFERRED EMBODIMENTS

Figure 1:
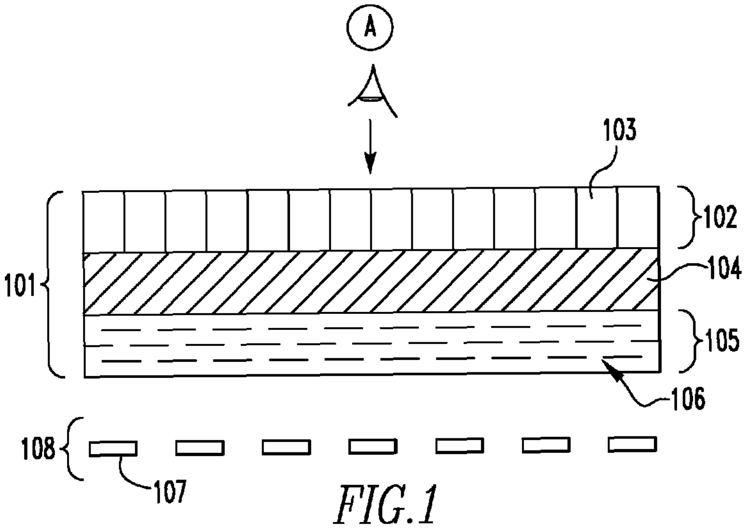
FIG. 1 is a side elevational view of an example OVD in accordance with an embodiment of the disclosed concept.

As employed herein, the term "optically variable device" (OVD) is used in its conventional broad sense and includes the use of a single optical element alone or multiple optical elements arranged in an array which may or may not be touching each other, overlapping, or physically in close proximity to each other. Thus, a "security device" as employed herein, refers to any known or suitable device which employs one or more OVD's in order to verify the authenticity of the article on which the security device is disposed, and to deter and resist copying or counterfeiting of the article.

As employed herein, the term "article" refers to an item or product on which the exemplary OVD is employed, and expressly includes, without limitation, articles used in high-security, banking, identification, and brand protection markets, such as, for example, identification cards, credit cards, debit cards, smart cards, organization membership cards, security system cards, security entry permits, banknotes, checks, fiscal tax stamps, passport laminates, legal documents, packaging labels and other information-providing articles wherein it may be desirable to validate the authenticity of the article and/or to resist alteration, tampering or reproduction thereof.

As employed herein, the terms "object" and "data element" refer to any known or suitable graphic, picture, array, pattern, or the like which is implemented within the exemplary OVD for purposes of exhibiting a desired optical effect (e.g., without limitation, magnification, movement or animation, or color change). By way of example, an optical effect in accordance with one embodiment of the invention is a magnified visual representation of the object when the OVD is viewed from a predetermined relative observation point. One or more objects may be arranged by themselves or in combination with other objects, elements, and arrays, in any suitable configuration, in order to form an "object array," "object layer," "micro-object layer," "data element array," "data element layer," or "data element volume" in accordance with this disclosed concept.

For simplicity of illustration, the example OVD's shown in the figures and described herein in accordance with the disclosed concept are shown in simplified and exaggerated form. Specifically, in order to more clearly show the features or components, elements, layers, and overall structure of the OVD's, certain features of the OVD's, such as the thickness of various structures, have been illustrated in exaggerated form, and therefore are not to scale.

A volume hologram is a data-bearing volume which is well known in the art, and is an array of reflective and/or diffractive elements created by standing wave patterns formed by the interference of at least two coherent laser radiation wave patterns within a light-sensitive volume. One of the wave patterns is reflected from or transmitted through a target subject and is incident on one side of the light sensitive volume. The second wave pattern is substantially different from the subject wave pattern and is usually a plane wavefront called the reference wave. The reference wave can also be a complex wave. The reference wave is incident on the light-sensitive volume but from the side opposite to the wave carrying the subject information.

Once the hologram has been exposed and processed, light incident at the same angle as the reference wave will reconstruct or project an image of the original subject at, or very close to, the position of the original subject.

In a preferred embodiment of the disclosed concept, the data-bearing volume is a volume hologram where the projected holographic image forms the array of micro-objects necessary to fulfill the conditions for moiré magnification.

FIG. 1 shows an OVD 101 having a focusing layer 102 comprising an array of focusing elements 103, a support substrate 104, and a volume hologram 105 comprising one or more reflective and/or diffractive data elements 106. The focusing elements 103 can be gradient index optics or conventional refractive lenses, diffractive lenses, or hybrid lenses. The support substrate 104 is optically clear to allow light through to the volume hologram 105 which reconstructs the micro-objects 107 to pre-determined virtual positions, as shown. The light is reflected or diffracted by the data elements 106 within the volume hologram 105 to create the virtual object array 108 which in conjunction with the focusing layer 102 satisfies the conditions for moiré magnification. A magnified image 200 of the virtual object array 108 will be observed from point A.

Figure 1A:
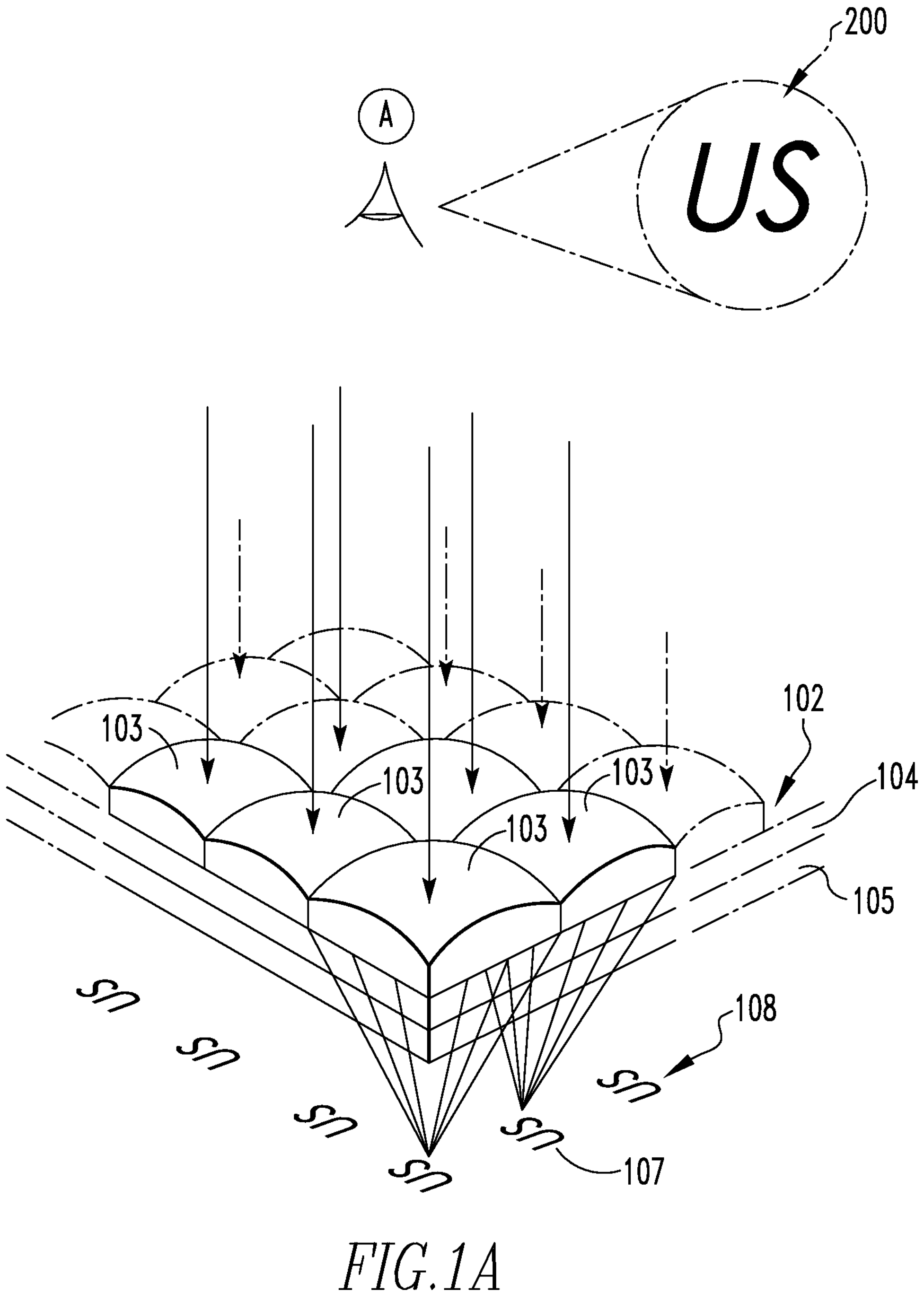
FIG. 1A is an isometric view of an example OVD and magnified image in accordance with an embodiment of the disclosed concept.

For example and without limitation, the volume hologram 105 could reconstruct an array 108 of discrete identical shapes such as, for example, an array of an alphanumeric character or characters 107, such as the characters "US", shown in the non-limiting embodiment of FIG. 1A. More specifically, with reference to the example of FIG. 1A, each virtual position 107 would be occupied by a virtual image of the characters "US," whereas the virtual object array 108 is an array of a plurality of "US" characters repeated, as shown. As shown (e.g., to the right of observation point A from the perspective of FIG. 1A), when viewed through the focusing layer 102, which in FIG. 1A is an array of convex lenses 103, the observer will see a magnified version of the "US" characters when the volume hologram 105 is illuminated at a particular angle (e.g., without limitation, from observation point A). To construct a volume hologram 105 that reconstructs a virtual object array 108 comprising an array of identical characters "US," a volume of light-sensitive material is exposed to two coherent laser radiation wave patterns. One wave pattern is reflected off of a physical representation of, or transmitted through a transparency of, an array of characters "US" (commonly referred to as the object wave), and the other wave pattern (commonly referred to as the reference wave) is oriented to strike the other side of the light-sensitive volume directly without reflecting from the array. The two wave patterns interfere within the volume creating standing wave patterns that serve to encode and record an image of the object array 108 of characters "US." Once processed, the volume hologram 105 will reconstruct a virtual image 200 of the original object array 108 of characters "US" when illuminated by light incident at the same angle as the reference wave.

The light illuminating the construction must be from the side of the observer and the reconstructed micro-objects are created within a specific range of angles determined by the geometry prevalent during the creation of the volume hologram. The magnified image can therefore be created with a specific cone angle of view. Furthermore, the data-bearing volume can carry reflective and/or diffractive interference planes from several different micro-object arrays and each can be made to replay at different cone angles of view creating multiple magnified images within the same plane but at different angles of view to an observer. This multiplexed object array is substantially different from object arrays created by printing or surface relief whose replay and layer geometries are fixed. The virtual object arrays can be made to focus at any distance from the data-bearing volume, and since it is the distance from the focusing elements to the micro-object arrays that determine the conditions for moiré magnification, the layer thickness of the substrate can be very thin.

Figure 2:
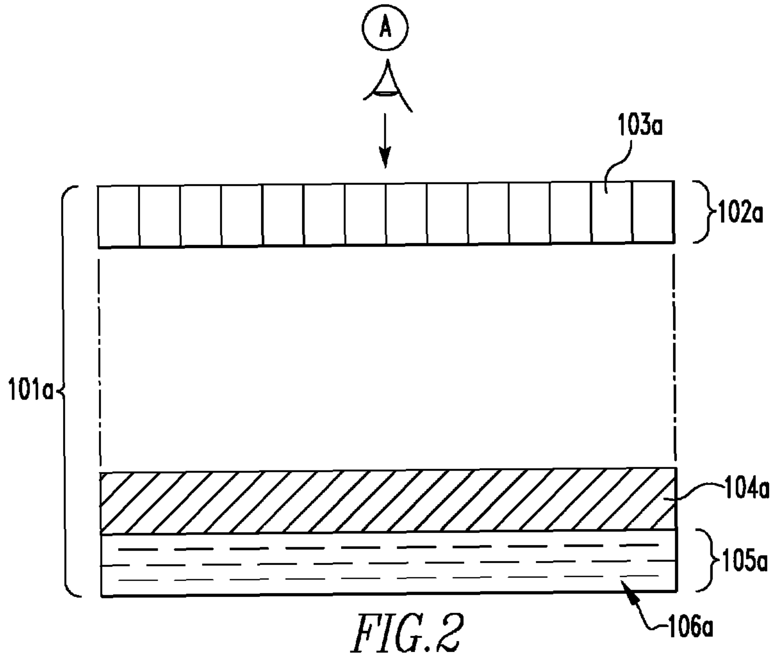
FIG. 2 is a side elevational view of an example OVD in accordance with an embodiment of the disclosed concept.

In another embodiment of the disclosed concept the focusing layer may be a separate element and recombined with the volume hologram 105*a* in a post production environment. FIG. 2 shows an OVD 101*a* in two parts: a first part, comprising the focusing layer 102*a* made up of an array of focusing elements 103*a*, and a second part, comprising a support substrate 104*a* and a volume hologram 105*a* comprising one or more reflective and/or diffractive data elements. The support substrate 104*a* and volume hologram 105*a* may be affixed to an article, such as for example, a security document. When the focusing layer 102*a* is placed over the support substrate 104*a* and volume hologram 105*a*, the focusing elements 103*a* will reveal the magnified image, providing a covert forensic security feature.

Figure 3:
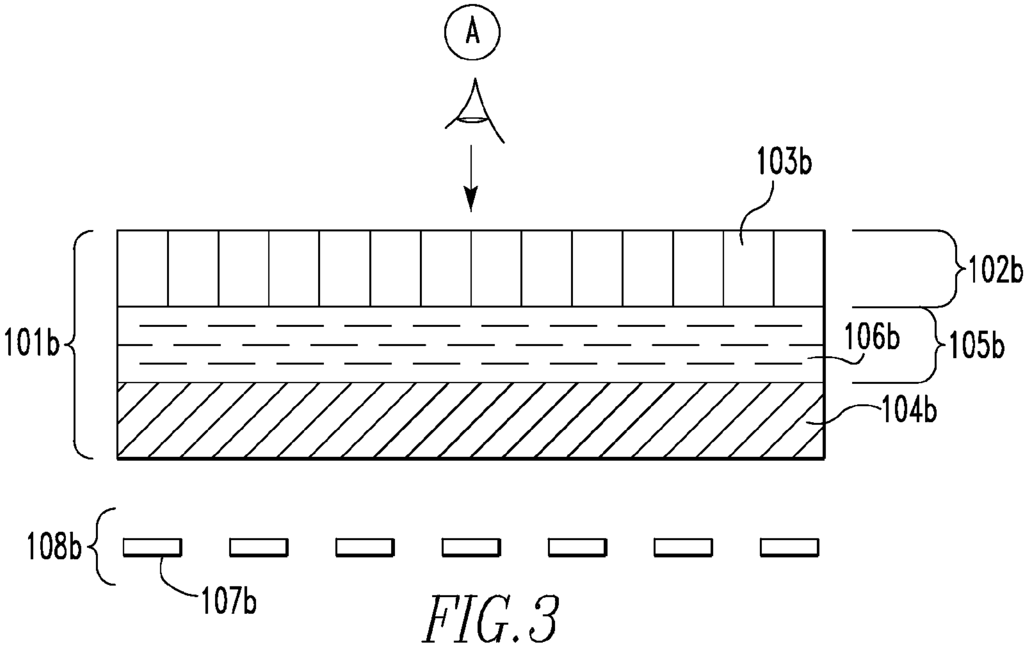
FIG. 3 is a side elevational view of an example OVD in accordance with an embodiment of the disclosed concept.

FIG. 3 shows yet another embodiment of the disclosed concept wherein the focusing layer 102*b* is applied directly to the surface of the volume hologram 105*b* containing interference patterns relating to single or multiple micro-object arrays at different angles of view. In this embodiment, the support substrate 104*b* does not need to be optically clear.

The focusing layer 102*b* and the volume hologram 105*b* may be formed in separate substrates and joined together, or the focusing array 102*b* can be formed directly into the surface of the volume hologram 105*b* for example by embossing or molding into the surface of the photo-polymer material that comprises the volume hologram 105*b*. In this embodiment also, the support substrate 104*b* does not need to be optically clear.

In another embodiment of the invention (not shown) the focusing layer may be a separate element and re-combined with the volume hologram in a post production environment. The focusing elements will reveal the magnified image when laid over an article containing the volume hologram, providing a covert forensic security feature. For example and without limitation, it will be appreciated that the level of magnification (i.e., how large or small the visual representation appears) and/or rotation of the magnified object element can change as the focusing array is misaligned (e.g., without limitation, rotated) with respect to the object array.

Figure 4:
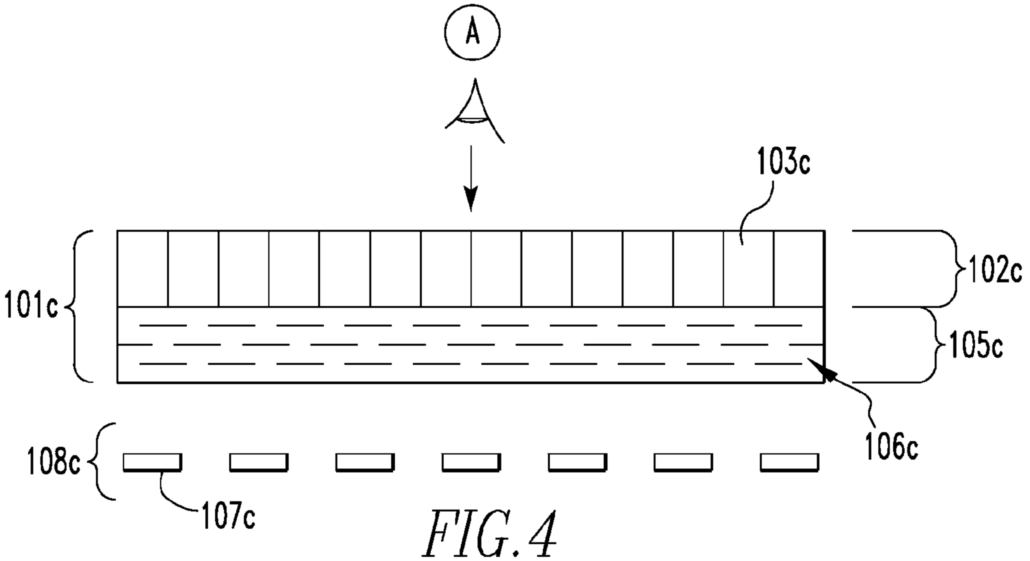
FIG. 4 is a side elevational view of an example OVD in accordance with an embodiment of the disclosed concept.

In another embodiment of the disclosed concept, a release and adhesive layer is applied between the support substrate and the data-bearing volume such that on application, the release layer is activated and the support substrate is removed before the focusing layer is added. This leaves a very thin construction which is suitable for applications such as laminates and in particular, passports. FIG. 4 is a representation of an OVD 101*c* of this embodiment with the support substrate removed and the focusing layer 102*c* combined with the volume hologram 105*c*. Light entering the volume hologram 105*c* is reflected or diffracted by the data elements 106*c*, creating the virtual object array 108*c* comprising reconstructed micro-objects 107*c* at predetermined virtual positions. The virtual object array 108*c* in conjunction with the focusing layer 102*c* satisfies the conditions for moiré magnification, resulting in a magnified image of the virtual object array 108*c* being observable from point A.

A further embodiment would be again to provide the focusing layer as a separate element, making a covert forensic feature.

Figure 5:
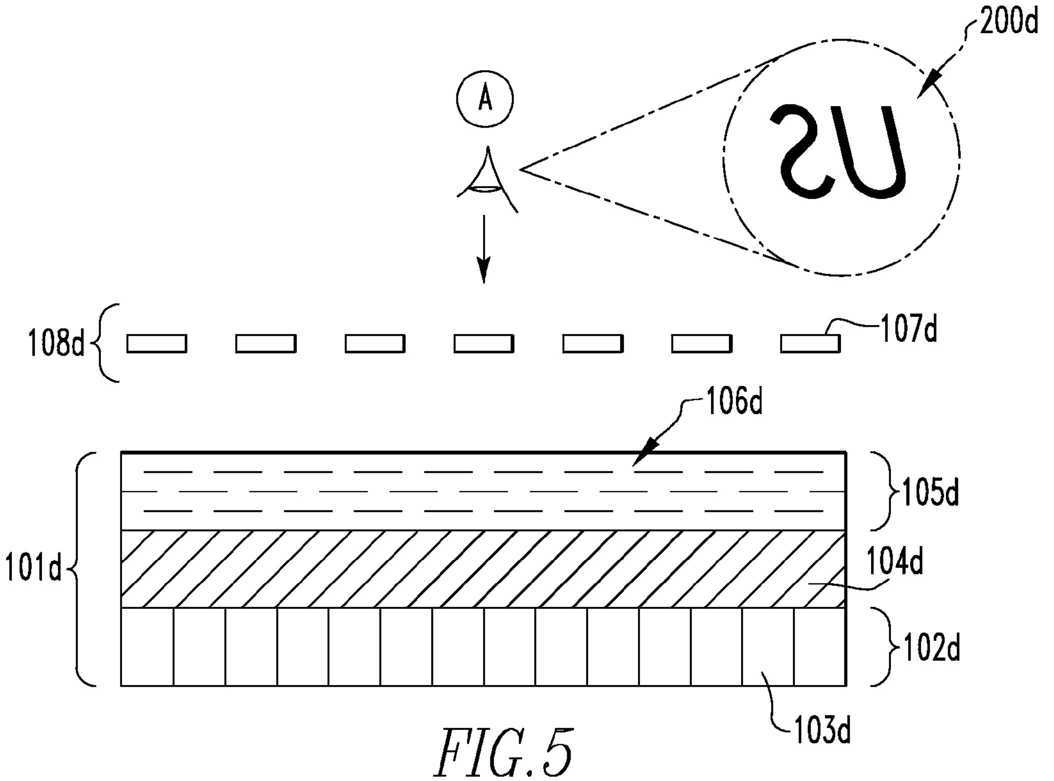
FIG. 5 is a side elevational view of an example OVD in accordance with an embodiment of the disclosed concept.

FIG. 5 shows another embodiment of OVD 101*d* of the disclosed concept wherein the focusing layer 102*d* is comprised of focusing elements 103*d* that are reflecting magnifiers. In this embodiment, the support substrate 104*d* is optically clear to allow light through to the focusing layer 102*d*, where it is reflected back through the support substrate 104*d* and into the volume hologram 105*d*, which reconstructs the micro-objects 107*d* to predetermined virtual positions. The light is reflected and/or diffracted by the data elements 106*d* within the volume hologram 105*d* to create the virtual object array 108*d* which in conjunction with the focusing layer 102*d* satisfies the conditions for moiré magnification. A magnified mirror image 200*d* of the virtual object array 108*d* will be observed from point A, as shown.

Additional embodiments of the disclosed concept may combine a focusing layer comprising reflecting magnifiers in two-part arrangements with the substrate between the object layer and the focusing layer, with the focusing layer applied directly to the surface of the volume hologram, or with a release layer applied between the support substrate and the data-bearing volume such that on application, the release layer is activated and the support substrate removed before the focusing layer is added.

Figure 6:
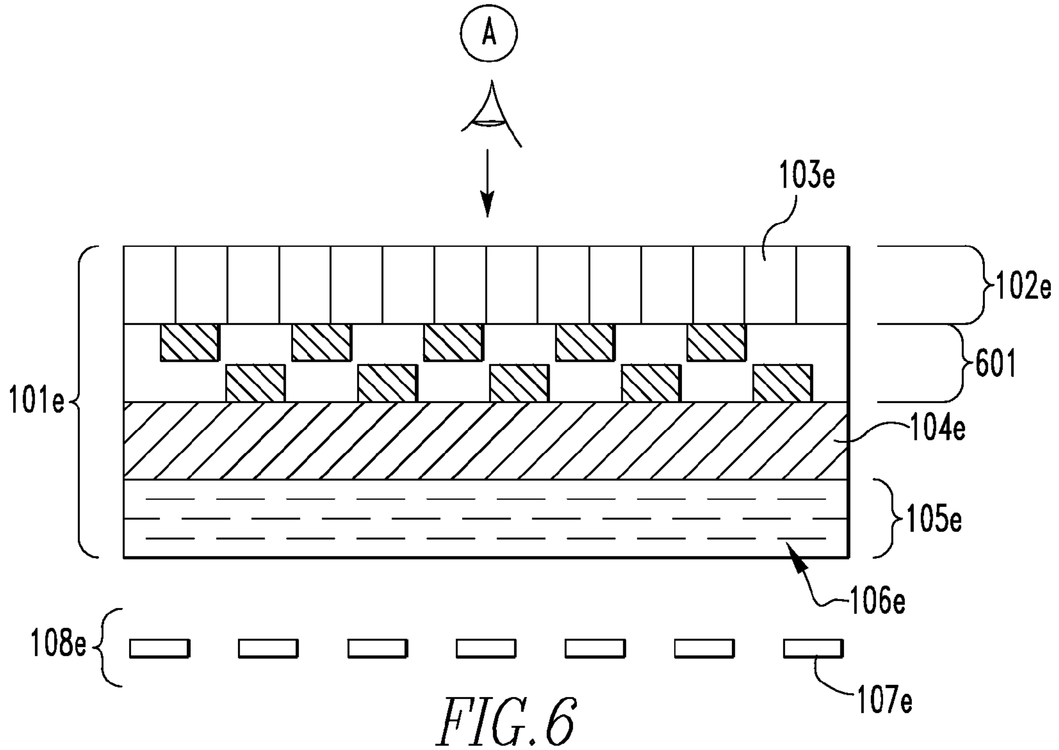
FIG. 6 is a side elevational view of an example OVD in accordance with an embodiment of the disclosed concept.

For additional security, an anti-tamper feature may be incorporated into the OVD. FIG. 6 shows an embodiment of an OVD 101*e* of the disclosed concept wherein a patterned release layer 601 is disposed between the focusing layer 102*e* and the support substrate 104*e*. The OVD 101*e* then forms a tamper-evident unit or label which, when applied to an article by means of an adhesive, provides a method of denoting visually evidence of attempted tampering or alteration. Any attempt to remove or tamper with the OVD 101*e* causes the patterned release layer 601 to separate and thus disrupt regions of moiré magnification of the virtual object array 108*e* by the focusing layer 102*e*, thereby clearly indicating to the observer that the OVD 101*e* has been tampered with.

In another embodiment comprising an anti-tamper feature (not shown), the support substrate 104*e* may be disposed on the side of the volume hologram 105 away from the observer (an arrangement such as shown in FIG. 3), and the patterned release layer 601 may be disposed between the focusing layer 102*e* and the volume hologram 105*e*. In this embodiment the support substrate 104*e* need not be optically transparent.

In a related embodiment, a release and adhesive layer (not shown) may be disposed between the support substrate 104*e* and the volume hologram 105*e* such that, upon application, the release layer is activated and the support substrate 104*e* is removed before the patterned release layer 601 and focusing layer 102*e* are joined.

In addition to volume holograms, other volume effects can be used to provide data elements that create micro-objects. For example and without limitation, Lippmann photographs can be used. In Lippmann photography, a process similar to volume holography and also well-known in the art, light from a subject is focused onto a volume that is light sensitive and in direct contact with a reflecting surface. The light is reflected back on itself causing interference and establishing standing waves which react with the light sensitive media. During chemical processing the standing wave nodes/antinodes become changes in refractive index in the volume and reflect light by a process known as Bragg reflection. Different from volume holograms, the incident light is natural white light having no coherence and therefore the standing wave patterns are made at different periods depending upon the color of the light. When processed and illuminated the light is reflected in all directions, but light reflecting in the direction in which the standing waves have been generated will interfere constructively for each wavelength. This results in a very strong, high resolution, full color image of the original subject. Such images can provide very high resolution, full color micro-object arrays that fulfill the conditions for moiré magnification.

Figure 7:
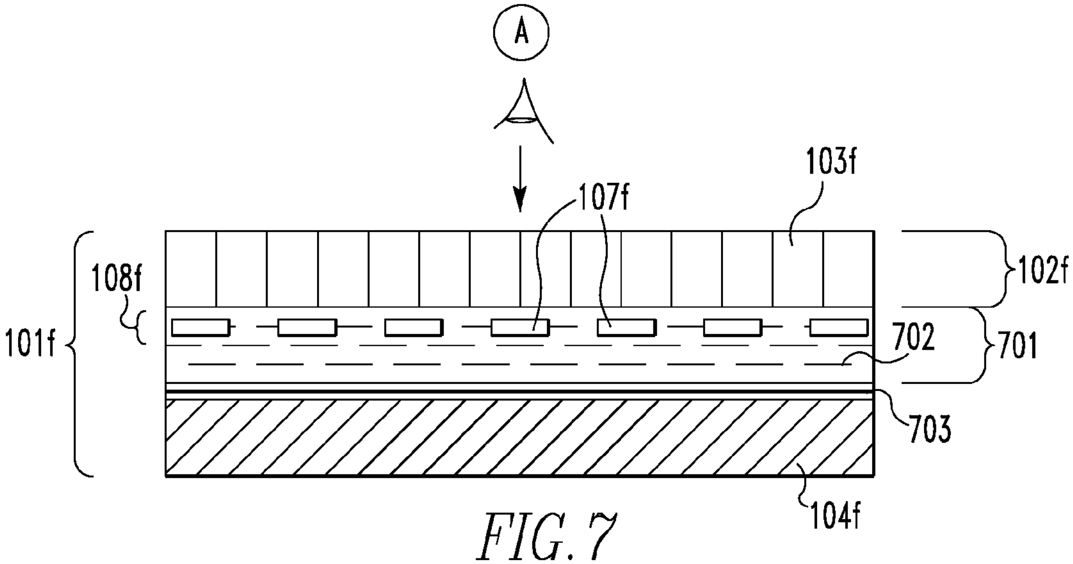
FIG. 7 is a side elevational view of an example OVD in accordance with an embodiment of the disclosed concept.

FIG. 7 shows an OVD 101*f* having a focusing layer 102*f* comprising an array of focusing elements 103*f*, a support substrate 104*f*, and a Lippmann photograph 701 comprising one or more refractive index changes (Bragg reflectors) 702. A reflecting layer 703 is disposed between the support substrate 104*f* and the Lippmann photograph 701. As before, the focusing elements 103*f* can be gradient index optics or conventional refractive lenses, diffractive lenses, or hybrid lenses. The support substrate 104*f* need not be optically clear. The reflecting layer 703 can be formed from any suitable reflecting material, for example and without limitation, a reflective metal such as aluminum. The illuminating light will be a diffuse white light and will come from the direction of the observer at point A, which will reflect off the refractive index changes 702, within the data bearing volume 701 to create the reconstructed micro-images 107*f* in the virtual object array 108*f* which in conjunction with the focusing layer 102*f* will satisfy the conditions for moiré magnification. A magnified image of the full color high resolution micro-images 107*f* will be seen by an observer at point A according to the geometry of moiré magnification and at a predetermined angle of view.

In addition to a volume hologram and a Lippmann photograph, the data-bearing volume of the disclosed concept may be comprised of a multi-layer optical interference film wherein the composition of the layers provides an iridescent reflection over a given range of wavelengths of light and wherein the continuity of one or more of the layers is altered to provide a means of encoding optical data within body of the film.

The technology of optical interference films is well known in the art. Such films can be categorized into two groups: those composed of a stack of a low number of layers, typically (but not limited to) 3 to 5 layers, and those composed of a stack of a high number of layers, typically (but not limited to) 10 to 100's of layers, that form Bragg-type structures. In both cases, the stacks are comprised of layers that alternately differ in refractive index.

In a further embodiment of the disclosed concept the data-bearing volume is comprised of an optical interference film containing of a low number of layers. The material of the layers may be all dielectric or metal dielectric or combinations thereof. The layers may be coated by any of several methods well known in the art such as vacuum evaporation, vacuum sputtering, chemical vapor deposition methods and the like. In the case where a film layer is formed from an organic chemical material, printing, coating or extrusion methods known in the art may be advantageously employed.

Illustrative examples of such optical interference films would be:

| Material | Thickness (nm) | Refractive Index |
|---|---|---|
| 1) a dielectric five-layer film: | | |
| $ZrO_2$ | 99 | 2.2 |
| $Al_2O_3$ | 93 | 1.76 |
| $ZrO_2$ | 99 | 2.2 |
| $Al_2O_3$ | 93 | 1.76 |
| $ZrO_2$ | 99 | 2.2 |
| 2) a dielectric three-layer film: | | |
| ZnS | 125 | 2.4 |
| Polyvinyl alcohol | 300 | 1.52 |
| ZnS | 125 | 2.4 |
| 3) a metal dielectric three-layer film: | | |
| Cr | 10 | n/a |
| $MgF_2$ | 500 | 1.38 |
| Al | 50 | n/a |

If one or more layers in the film stack is made discontinuous in the form of a specific patternation, either by having its optical properties altered or by being absent in specific areas, then the optical interference effects in those areas where the particular layer is altered will change. In the case where the layer is absent the optical interference effect will reduce substantially and in the case of the three-layer stacks, will disappear completely. If the discontinuity of the said layer takes the form of a specific shape, for example and without limitation, an alpha-numeric text, logo, bar code, or other such graphic, then the optical film stack can be encoded to provide a means of data storage within the volume of the said optical interference film stack. If the discontinuity takes the form of an array of micro-objects, then the optical film stack can function as an object array for the purpose of moiré magnification.

The encoding or discontinuous patternation coating of one or more layers in the optical interference film stack can be achieved by various methods known in the art. Illustrative examples of such methods for the metal dielectric three-layer film shown above would be to vacuum coat the aluminum layer or the chromium layer or both through a physical mask having a shaped aperture, by vacuum coating said layers by methods of selective metallization, or by vacuum coating said layers and then removing part of the coatings by methods of demetalization.

For the dielectric three-layer film shown above, a preferred illustrative example of an encoding method would be to coat or print by known methods the polyvinyl alcohol layer in a specific discontinuous patternation.

Figure 8:
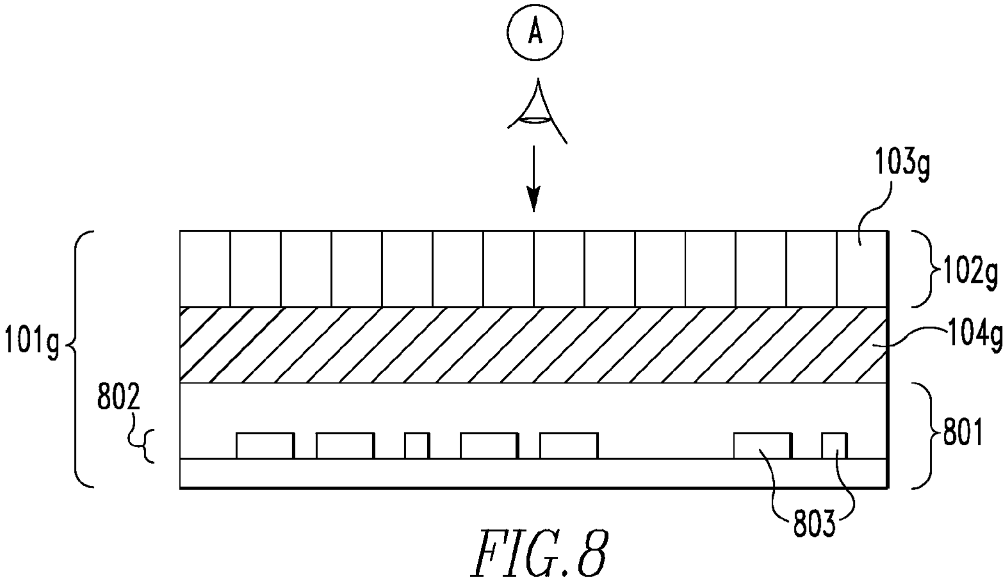
FIG. 8 is a side elevational view of an example OVD in accordance with an embodiment of the disclosed concept.

FIG. 8 shows an OVD 101*g* having a focusing layer 102*g* comprising an array of focusing elements 103*g*, a support substrate 104*g*, and a dielectric three-layer optical interference film stack 801 wherein the center layer 802 has been made discontinuous in the form of a specific predetermined patternation. The patterned center layer 802 defines various data elements 803. The focusing elements 103*g* can be gradient index optics or conventional refractive lenses, diffractive lenses, or hybrid lenses. The support substrate 104*g* is optically clear to allow light through to the film stack 801. Light is reflected off the data elements 803, within the film stack 801, forming the micro-objects which cooperate with the focusing elements 103*g* to satisfy the conditions for moiré magnification. A magnified image of the micro-objects will be observed from point A.

In another embodiment of the disclosed concept (not shown) the data-bearing volume is comprised of an optical interference film containing a high number of layers wherein the alternate layers differ in refractive index. If each layer has a uniform optical thickness (defined as thickness of layer× refractive index of layer material), then the layer boundaries will efficiently reflect a narrow bandwidth of light by Bragg reflection, the same kind of interference structure found in volume holograms and Lippmann photographs. In this embodiment, the film stack is encoded by altering the optical characteristics of some or all of the constituent layers by methods similar to those described above for three-layer films. Illuminating light will come from the direction of the observer, which will reflect off the optically active reflective layer boundaries according to the predetermined encoded pattern. Acting as Bragg reflectors, the reflective layer boundaries create reconstructed micro-images in a virtual object array which in conjunction with the focusing layer will satisfy the conditions for moiré magnification. A magnified image of the virtual micro-images will be seen by an observer according to the geometry of moiré magnification.

In addition to volume holograms, Lippmann photographs, and laminated film stacks, Bragg interference structures can be formed in layers of liquid crystal material. In particular embodiments of the disclosed concept the data-bearing volume is comprised of a layer of liquid crystal material wherein the light reflecting or polarizing properties of the liquid crystal material are patternated in a specific manner as a method to encode or record the object data.

It is well known in the art that cholesteric liquid crystal material can be coated onto a substrate and the molecular structure of the liquid crystal, when in its meso-phase, can be aligned to form Bragg reflection and interference structures that are orientated substantially horizontally planar to the plane of the substrate. Such a process results in a structure that exhibits iridescent reflection of light. The alignment of the liquid crystal can be produced in several ways as, for example but without limitation, by causing a shear action during the coating process by knife or slot coating, or by lamination of the coated liquid crystal layer between two polymeric substrates. The color-reflecting meso-phase of the liquid crystal material is thermo-chromic and if the temperature of the aligned film is raised, the reflected bandwidth of color shifts towards shorter wavelengths, eventually becoming invisible to the human eye. At higher temperatures the liquid crystal material becomes liquid, losing its meso-phase and light-reflecting Bragg interference structure. If the liquid crystal material is polymerized in the aligned meso-phase state, the Bragg reflection properties can be made thermally stable and permanent. This can be achieved, for example but without limitation, by mixing a cross-linker and photo-initiator with the liquid crystal material and exposing the aligned meso-phase liquid crystal mixture to ultraviolet (UV) light.

The ability to preserve or remove the alignment of the liquid crystal coating in specific areas of the coated film and thereby modify the coating's reflective or polarizing properties provides a method for recording or encoding data in the film volume. This can be achieved, for example but without limitation, by exposing the coated film and aligned liquid crystal mixture, containing cross-linker and photo-initiator, to UV radiation through an optical mask to polymerize the coating in the UV-exposed areas. The film is subsequently heated to shift the color of the remaining un-polymerized areas outside the visual range or to destroy the Bragg interference structure of the meso-phase entirely. The entire film is then exposed to UV radiation to polymerize the remaining un-polymerized areas and to stabilize the coated film.

Another example of a method to selectively modify the reflective or polarizing properties of specific areas of a film coated with liquid crystal material, but without limitation, is to scan the coated and aligned liquid crystal, cross-linker and photo-initiator mixture with a beam of laser light in a predetermined pattern to cross-link the film in the track of the laser beam, thereby preserving the optical properties of Bragg interference structure in these regions. The film is then thermally treated as described above to alter the optical properties of the remaining un-scanned area of the film. The film is then exposed to UV radiation to cross-link the remaining un-polymerized regions of the coating and stabilize the film. Alternatively, by using a laser light beam of suitable energy and power, a targeted chemical modification process, or other means, or a combination of means, the film in the treatment regions can be altered and the optical properties of the Bragg interference structure thereby altered. Subsequently, the coated film is exposed to UV radiation to polymerize the film as a whole.

Another example of a method to record or encode data in the film volume is to coat or print by known methods the liquid crystal material, mixed with an appropriate cross-linker and photo-initiator, in a specific discontinuous patternation.

Figure 9:
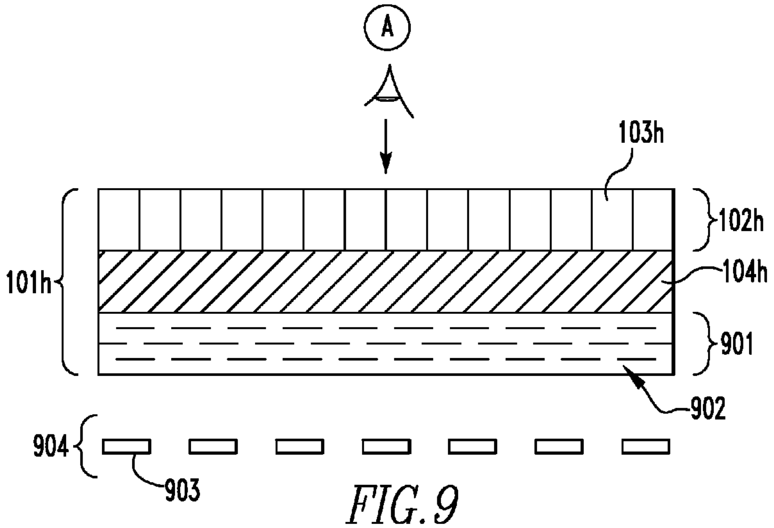
FIG. 9 is a side elevational view of an example OVD in accordance with an embodiment of the disclosed concept.

FIG. 9 shows an OVD **101*h* having a focusing layer 102*h* comprising an array of focusing elements 103*h*, a support substrate 104*h*, and a layer of cholesteric liquid crystal material 901 aligned to form Bragg reflection structures and subsequently encoded with a predetermined pattern by modifying the reflective or polarizing properties of specific areas of the coating by one of various methods known in the art, forming a specific pattern of discontinuous reflective data elements 902. The focusing elements 103*h* can be gradient index optics or conventional refractive lenses, diffractive lenses, or hybrid lenses. The support substrate 104*h* is optically clear to allow light through to the liquid crystal layer 901 which reconstructs the micro-objects to pre-determined virtual positions 903. The light is reflected off the data elements 904 within the liquid crystal layer 901 to create the virtual object array 904 which in conjunction with the focusing layer 102*h* satisfies the conditions for moiré magnification. A magnified image of the virtual object array 904** will be observed from point A.

It is well known in the art that the categories of liquid crystals known as nematic and smectic are in the form of oblong molecules that can be coated onto a substrate, and the orientation of the long axis of the molecules of the liquid crystal, when in its meso-phase, can be aligned to form highly ordered structures. These structures are oriented substantially perpendicular to the plane of the substrate and exhibit the optical activity of double refraction, providing strong light polarizing properties.

In another embodiment of the disclosed concept (not shown), the data-bearing volume is comprised of an optically active polarizing material, wherein the data is encoded by varying the polarizing properties within the volume, so that the conditions for moiré magnification using the focusing layer are satisfied. The moiré image is then viewed using a separate uniform polarizer or by incorporating another layer within the device which uniformly polarizes to render a permanently viewable image. The substrate is used in the normal way to provide a controlled spacer and a support layer for the coating on either side. In this configuration maximum contrast is obtained with non-birefringent substrates. Any birefringence causes colored effects and loss of contrast. The effects of substrate birefringence can be largely removed if the viewing polarizer is placed directly over, and on the same side of the substrate, as the data layer.

The optically active data layer can be a nematic liquid crystal exhibiting linear polarizing properties. The material must be embedded in a UV cross-linkable polymer to allow the properties to be oriented then fixed for a permanent effect. There are several methods known in the art to align nematic liquid crystal materials and therefore orient polarizing properties in a patterned layer. These include optical photoalignment and various mechanically induced alignment methods.

Photo-alignment is provided using a thin layer of a photo sensitive material that is preprocessed to encode the data that will be embedded in the optically active layer that is added next. The alignment layers are typically about 20-80 nm thick and require polarized UV light to initiate and permanently fix the alignment. The optically active layer, a nematic liquid crystal layer, is then deposited on the alignment layer with sufficient thickness, typically about 1-2 um, to ensure good optical activity.

There are several mechanical methods that can be used to induce alignment in optically active polarizing materials such as nematic liquid crystals. These include, but are not limited to, rubbing and regular diffraction grating structures. Magnetic induced alignment is also another possible method. Any of these methods can be used to make patterned or uniform linear polarizers in thin layers.

The above describes the use of linear polarizing materials in the patterned layers to encode data; however, circularly polarizing materials such as cholesteric liquid crystals can also be used. The data can be encoded using various methods including, but not limited to, thermal or pressure induced pitch change or use of opposite-handed optical activity materials in different areas of the data layer. Viewing of data then requires use of a uniform circular polarized layer or combined or separated quarter wave and linear polarizing layers. In fact, the polarizing optically active layer can encode data in any elliptical polarized state between linear and circular depending on the material properties and the alignment and encoding method used.

In another embodiment of the disclosed concept, nematic liquid crystals are coated over an alignment layer that has been preprocessed to encode the data, resulting in data encoded by the orientation of the linear polarizing properties of the liquid crystal. A uniformly polarizing layer is incorporated so that the final viewed image can be made visible.

Figure 10:
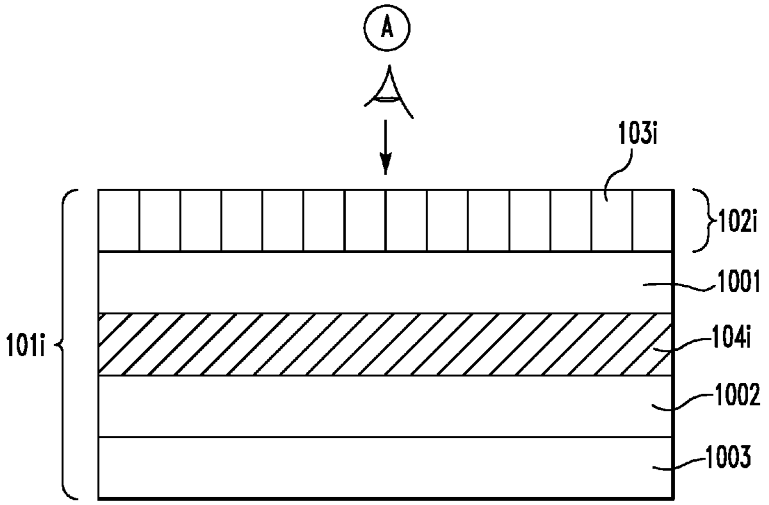
FIG. 10 is a side elevational view of an example OVD in accordance with an embodiment of the disclosed concept.

FIG. 10 shows an OVD **101*i* having a focusing layer 102*i* comprising an array of focusing elements 103*i*, a uniformly polarizing layer 1001, a support substrate 104*i*, an alignment layer of cured photosensitive material 1002, and a polarized data layer of nematic liquid crystal material 1003. The focusing elements 103*i* can be gradient index optics or conventional refractive lenses, diffractive lenses, or hybrid lenses. Illuminating light enters the OVD 101*i* from the side of the observer at point A. The support substrate 104*i* is optically clear to allow light to pass through to the polarized data layer 1003 and alignment layer 1002. The alignment pattern encoded within the alignment layer 1002 aligns the liquid crystals in the polarized data layer 1003, reflecting a pattern of similarly polarized light that, being visible through the uniformly polarizing layer 1001, serves as a micro-object array which, in conjunction with the focusing layer 102***i*, satisfies the conditions for moiré magnification. A magnified image of the alignment pattern encoded in the alignment layer 1002 will be observed from point A.

In a related embodiment (not shown), instead of being an integral layer of the OVD, the uniformly polarizing layer 1001 is a separate element that can be held to the observer's eye or placed on the surface of the OVD by the observer as a viewing polarizer. In this two-piece embodiment, the observer may rotate the uniformly polarizing layer 1001 around the axis of the direction of view to see the contrast in the viewed image continuously change.

In another embodiment the uniformly polarizing layer 1001 is located between the alignment layer 1002 and the substrate 104*i*. This configuration renders the data viewable in intensity at that point and consequently, in conjunction with the focusing layer 102*i*, as a moiré magnified intensity image. This configuration removes the need for a non-birefringent substrate, making a wider range of materials usable. It also reduces the product thickness in line with market needs.

In a further embodiment, the polarizing data layer 1003 is a birefrigent material wherein the data is encoded by retardation, allowing circular polarization to be used to encode the data. This configuration also allows the possibility for controlled color effects as the retardation varies with wavelength. Circular polarizers are then required for viewing although the addition of a uniform quarter wave retarding layer in the device and a separate linear polarizing viewer would render the image visible. Circular polarization is in fact a special case and any degree of elliptical polarization could be used with an appropriate viewing polarizing layer within the construction or as a separate viewer.

In another embodiment, a cholesteric liquid crystal circularly polarizing layer may be used to encode the data by reverse-handedness or by variation of the pitch of the cholesteric helix. Again as in the previous embodiment either a circular polarizer or the incorporation of a quarter wave layer into the device and a separate linear polarizing viewer is necessary.

These embodiments can be modified by using arrays of reflecting magnifiers as the focusing layer 102 and reversing the layer order to produce reflection constructions. In these configurations, extra phase changes occur that modify polarization, requiring viewing polarizers 1001 that are slightly altered.

Figure 11:
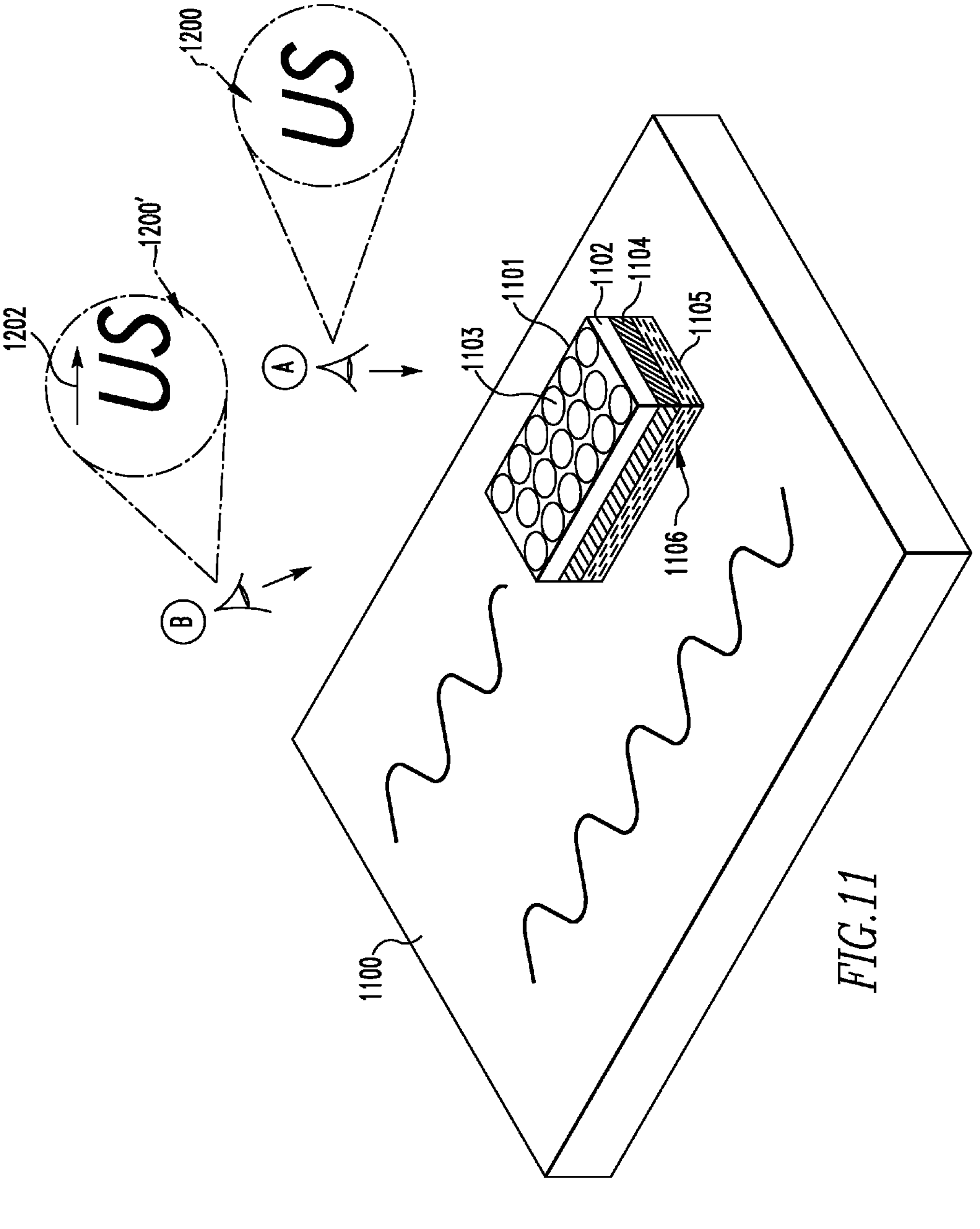
FIG. 11 is a simplified and exaggerated perspective view of an article employing an OVD in accordance with an embodiment of the disclosed concept.

FIG. 11 shows an example article 1100 having affixed an OVD 1101 employed as a security device according to one embodiment of the disclosed concept. The OVD 1101 has a focusing layer 1102 comprising an array of spherical refracting focusing elements 1103, a support substrate 1104, and a data-bearing volume comprising a volume hologram 1105. Data elements 1106 are recorded within the volume hologram 1105 as light interference effects. Specifically, a paper document 1100, such as a banknote or check, is shown to incorporate an OVD 1101 which exhibits a magnified visual representation 1200 (see, for example, magnified representation of the characters "US") of the virtual micro-object array reconstructed from the data elements 1106 in the volume hologram 1105 when viewed from a predetermined relative observation point at A. When the relative observation point is shifted to point B, either by moving the observer's point of view or by tilting, rotating, or moving the article 1100, the magnified visual representation 1200' perceived by the observer changes, alerting the observer that the article 1100 is genuine. For example and without limitation, in the example shown, the magnified representation, "US" 1200, appears to float and move in the opposite direction with respect to the change in relative observation point. That is, as the observation point is moved from position A to position B (e.g., right to left from the perspective of FIG. 11), the floating image, "US" 1200', will appear to move in the opposite direction of arrow 1202 (e.g., left to right from the perspective of FIG. 11). If the article 1100 were counterfeit, the magnified visual representation would not change with changes in relative observation point. Additionally, the volume hologram 1105 may be encoded with multiple layers of data elements 1106, each visible only within a narrow cone of view. In this case, completely different predetermined magnified images would be perceived at observation points A and B. For example and without limitation, the characters "US" could be observed as shown when viewed from observation point A, but from observation point B the observed image could change to the characters "OK" (not shown), for example, to further confirm the authenticity of the article 1100.

Figure 12:
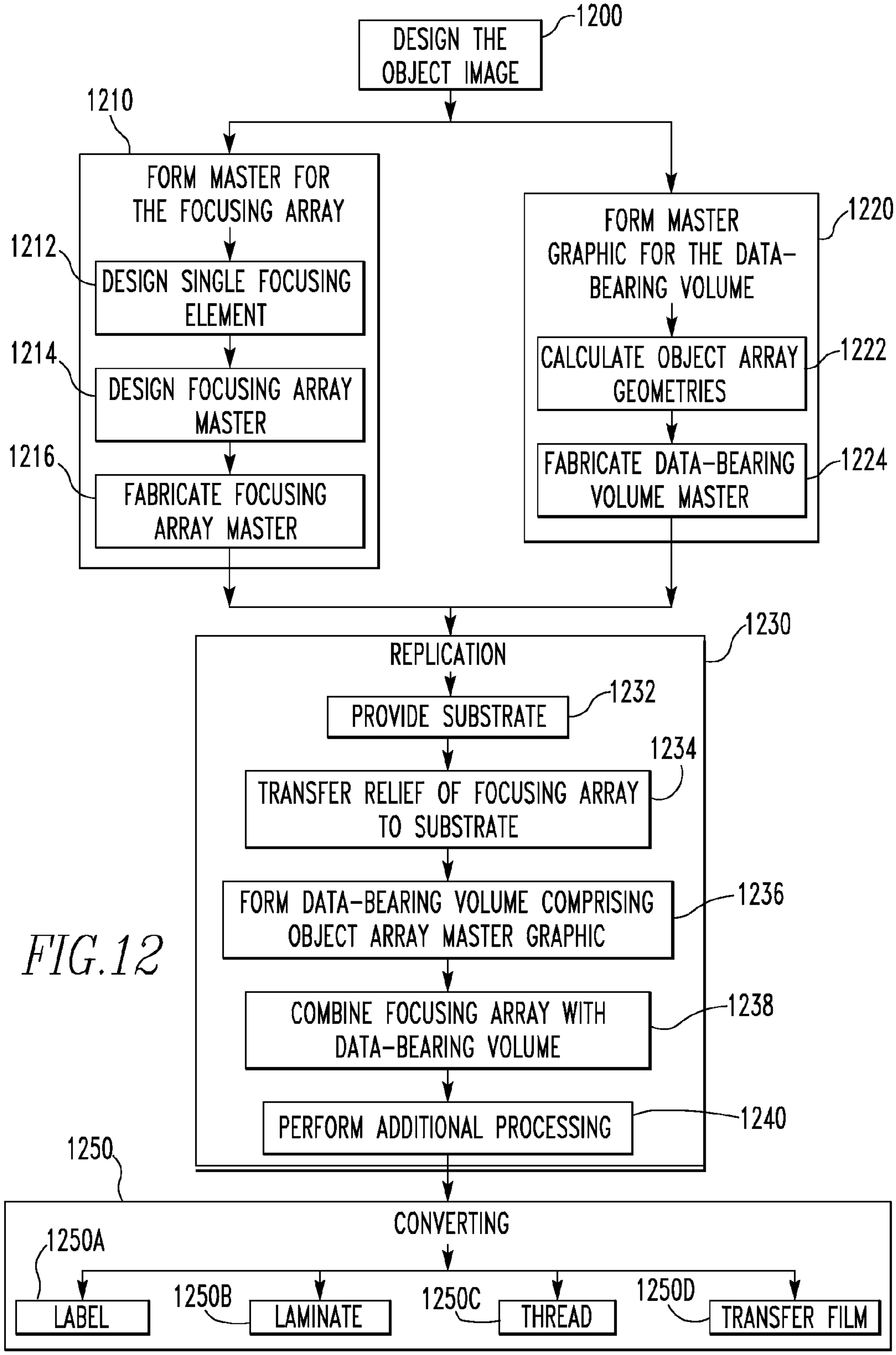
FIG. 12 is a flow diagram illustrating the steps of a method of making an OVD in accordance with an embodiment of the disclosed concept.

FIG. 12 is a flow diagram illustrating the steps of a method of making an OVD 101 having a data-bearing volume comprising data elements that form an object array according to the disclosed concept. The method begins with the graphic design of the object image at 1200, and then follows two parallel generalized streams of process, one to form the master for the focusing array at 1210 and another to form the master graphic for the data-bearing volume at 1220. Steps 1210 and 1220 may take place in either order or simultaneously. Replication of the focusing array and the data-bearing volume takes place at 1230, and conversion of the replication into final form takes place at 1250. Within each of these steps, 1210, 1220, 1230 and 1250 are a number of additional sub-steps, some of which are required, and others of which are optional.

The master focusing array is formed at 1210. This step includes the further steps of designing a single focusing element 1212, designing a focusing array master 1214, and fabricating a focusing array master 1216.

The design of a single focusing element at 1212 must take the graphic design of the object image into consideration, as well as the optical effect desired, and comprises selection of design parameters such as, for example, the type, size and shape of the focusing element, the focal length of the focusing element, and the placement and geometry of the focusing and object elements. The design can be done by hand, or by using a design tool such as, for example, a suitable computer-based design program.

Design of the focusing array master at 1214 comprises combining single focusing elements into a focusing array comprising a plurality of elements. Again, the design may be done by hand, or by using a design tool such as, for example, a suitable computer-based design program. The focusing array may include multiple replications of a single focusing element, or may be comprised of two or more element designs in a suitable arrangement, depending on the optical effect desired.

Fabrication of a focusing array master at 1216 comprises the creation of a master plate to be used to emboss, mold or cast the focusing array into a substrate. In a preferred method, the focusing array design, having been created with the aid of a suitable computer-based design tool, is interfaced with the desired equipment for generating the master, for example equipment suitable for photography, electron beam lithography, or holography, to create the focusing elements. Equipment for ion or laser beam processes could also be employed. A master is made, preferably by the generally well-known process of electroforming. Specifically, the master for the focusing element array is produced in step 1216 on a printing plate or master plate commonly referred to as a shim. A shim generally comprises a thin piece of metal, such as nickel, which is mounted, for example, on a press for subsequent replication of the focusing array, which is contained in reverse relief on the shim's surface. The master may also be formed from other materials, for example opaque or transparent polymer resin.

The master graphic for the data-bearing volume is formed at step 1220. This step includes the further steps of calculating the object array geometries 1222 and fabricating the data-bearing volume master 1224.

The data-bearing volume master graphic may take different forms depending on the nature of the data-bearing volume and the replication process that will be utilized. In some cases, such as for example, where the data-bearing volume is a volume hologram or a Lippmann photograph, a master hologram or photograph is sufficient to serve as an original from which replicas will be made. In other cases, for example where the data-bearing volume is a construction comprising liquid crystal material, stacked thin-films, etalons, or polarizing materials, the master graphic may be a masking device, such as a photographic negative. Complex object arrays may require two or more masks, to be used successively in the replication process. In still other cases, such as for example, where the replication process comprises scanning or etching by a computer-controlled laser, ion, or e-beam device, there need be no master graphic at all, other than the virtual graphic stored in the scanning device's electronic memory.

In step 1222 the graphic design of the object image is used to calculate the object array geometries which will, in combination with the array of focusing elements, form the desired magnified image. A master, for example a hologram, Lippmann photograph, or mask, is created at 1224. Preferably the master will be in the form of an endless loop or belt so that multiple data-bearing volumes can be replicated in a continuous process.

Replication of the focusing array and the object array takes place at 1230. Sub-steps include providing a substrate 1232, transferring the relief of the focusing array master to the substrate 1234, forming a data-bearing volume comprising the object array master graphic 1236, and combining the focusing array with the data-bearing volume 1238. Additional processing may occur at 1240.

It is a preferred embodiment to employ means that allow the replication of the focusing and object arrays, combination of the focusing and object arrays, and additional processing to take place in-line and in register on the same piece of equipment.

A preferred method of producing the focusing array is to replicate the focusing array master in the form of a surface relief structure on the surface of a substrate film. The substrate film is provided at 1232, and may be of any suitable material, such as for example, polyester. As noted above, in some embodiments the substrate must be transparent to allow light to create the desired optical effect. In other embodiments, the substrate may be opaque.

At 1234, the relief is transferred from the focusing array master to the surface of the substrate film. This may be accomplished by any of several suitable and well-known methods such as, for example, molding, injection molding, embossing, and cast curing. A preferred method is to use a cast curing process such as that disclosed in U.S. Pat. No. 4,758,296 to McGrew, wherein a film-like substrate is coated with an ultraviolet (UV)-curable resin, and the coating is brought into contact with a metal plate bearing a surface relief pattern. The resin coating is subsequently cured by UV radiation and takes up the contours of the relief of the metal plate. The substrate and adhered cured resin coating is then peeled from the metal plate and the surface relief of the metal plate is so replicated. A greater utility for this process has been found by modifying the method disclosed by McGrew. In a preferred embodiment of the method of manufacture of the disclosed concept, the step of coating the substrate with a UV-curable resin to form the focusing elements is carried out by a method of rotary screen printing in order to form a coating of the required uniformity and coating thickness.

Furthermore, it is the usual practice in the art to add certain release agents, such as silicone-based compounds, to curable UV resin in order to facilitate release of the cured solid resin coating from the metal plate relief surface. However, an undesirable consequence of using a release agent is that the adhesion bond strength of the resin to the substrate or to subsequent coatings or layers such as the data bearing volume of the invention can be deleteriously affected. It has been found that the bond strength may be improved by application of a surface treatment, such as, for example, a chemical primer, corona treatment, flame treatment, or plasma treatment, to either or both of the substrate prior to resin coating or the cured resin after the curing stage. In a particular non-limiting example embodiment of the disclosed concept, it has been found that a greater utility of the process can be provided by utilizing surface treatments based on, but not limited to, atmospheric plasma discharges formed from argon and oxygen and excited by high voltage discharge, for example by about 5 kilovolts at a pulse rate of about 24 kilohertz. By varying the type of gas and the relative proportions of gases in the mixture as well as the plasma discharge energy, the surface energy and hence bonding ability of UV-cured resin to the substrate and to subsequent coatings or layers can be varied over a wide range.

The data-bearing volume including the object array master graphic is replicated at 1236. The method for replication depends on the type of data-bearing volume utilized, and may be, for example, an optical contact copy method, laser scan data transfer method, direct image transfer method, mask imaging method, or single or multiple print layer method. Preferably, step 1236 occurs in-line and in register with the formation of the focusing array, and may take place either before or after step 1234, replication of the focusing array.

A data-bearing volume in the form of a volume or reflection hologram may be replicated by a contact copying process. The master hologram is created as described previously using, for example, a silver halide or photopolymer material. The spacing of the Bragg reflecting elements is controlled by a combination of the original laser exposure and its chemical processing. Further refinements can be made to the data volume pre- and post-exposure in order to finely tune the spacing of the Bragg reflectors such that the image replay is most efficient under a predefined illumination wavelength. Once the master is so established, a copy can be made by placing a transparent film layer containing a suitable photosensitive material such as silver halide or photopolymer, immediately next to the master, and flood exposing the area of photosensitive film directly above the reflection master hologram with a predefined wavelength of light from a suitable light source, for example, a laser. Photopolymer material will not require any post-exposure processing and the process can be maintained in-line. Materials such as silver halide typically require a wet chemical developing and drying process.

In another embodiment, the laser illumination can be made by a laser scanning process wherein a small laser spot is scanned across and down the unexposed film layer directly above the master hologram.

A data-bearing volume in the form of a Lippmann photograph may also be replicated by the contact copying method described for holograms above. Lippmann photographs may also be replicated by other means, including by direct image transfer.

A data-bearing volume in the form of a liquid crystal layer may be created and replicated by fixing the aligned crystal through an image mask. The liquid crystal material is coated onto the film substrate where the crystals are aligned as described previously. The aligned crystal within the polymer matrix can be fixed by a controlled exposure to UV light. The exposure is made through a partially transparent image mask fixing only the areas associated with the predefined image design. The film is then passed through a temperature-controlled bath that de-aligns volumes of the liquid crystal material that have not been permanently fixed by the UV curing.

In another embodiment, a focused laser beam can be used to directly expose a high-resolution image onto the polymer layer, causing the liquid crystals to de-align in the areas of exposure, creating the image. Post UV-curing permanently fixes the image.

In a further embodiment, laser illumination can be varied to write fine detail image designs over chemically-altered liquid crystal material to change the chiral properties of the liquid crystal such that multiple color effects in register are created.

A data-bearing volume in the form of a multilayer stack of thin films or other etalon-type structures may be replicated by the direct printing of multiple interference layers at independent print stations. Data-bearing volumes that rely on polarizing layers may be replicated by direct printing of the layer(s) of polarizing material.

At 1238, the replicated focusing array is combined with the replicated data-bearing volume containing the object array. In a preferred embodiment, the steps of providing a substrate 1232, transferring the relief of the focusing array master to the substrate 1234, and forming a data-bearing volume comprising the object array master graphic 1236 are performed in-line and in register by coating a substrate with a UV-curable resin, casting focusing elements into the coating, and applying the data-bearing volume to the substrate by one of the methods described above. Thus, combination of the focusing and object arrays occurs at the point of formation of the second array. However, formation of the focusing and object arrays may be performed on separate machines, and in this case step 1238 refers to the joining, for example by lamination, of the two layers of material to each other such that the optical requirements necessary to form the desired optical effect are met. Depending on the complexity of the image and focusing elements, it may be necessary to add a registration mark to one or both of the arrays to assure proper alignment of the focusing elements with the object elements.

In some embodiments, the OVD 101 is provided in two pieces, a focusing array and an object array. In these embodiments, combination does not take place during the manufacturing process, rather it is accomplished by the user at the point of verification.

Additional processing may take place at 1240. Further processing steps such as providing the OVD 101 with a printed layer, protective layer, or coating, are contemplated by the disclosed concept. For example, one or more additional layers, such as an ink layer, a metallic layer, a transparent refractive or reflective layer, a protective layer, an additional substrate, and/or a diffractive layer construction, may be added. Preferably such steps take place in-line and in register with the previous steps of replicating and combining the focusing and object layers.

In step 1250 the OVD is converted to final form. Specifically, the OVD is produced as a label, step 1250A, as a laminate, step 1250B, as a thread, step 1250C, or as a transfer film, step 1250D. Each of these final forms has an appropriate application on a particular type and configuration of an article. For example, a label is created with the OVD directly applied to it, with the label being subsequently affixed to an article in order to function as a security device or mechanism for authenticating the article. For example, such labels are commonly employed on automobile license plates and inspection stickers to verify the registration and inspection status of the vehicle. Laminates can be applied to a wide variety of articles, for example, as a coating or covering. For example, hang tags which are attached to goods to provide authentication of the goods, often include one or more OVDs in laminate form. Thread comprises a delivery system of the OVD wherein the thread is woven or slid into the article with which it will be employed as a security device. Thin articles, such as valuable paper articles, often contain OVDs in thread form. Finally, transfer films comprise any type of film, such as, for example, foils, wherein the OVD is applied by hot or cold stamping the foil, and subsequently transferring the foil to the article.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the appended claims and any and all equivalents thereof.

What is claimed is:

1. An optically variable device comprising:

an array of focusing elements combined with a data-bearing volume containing visual data elements, wherein said visual data elements are contained within said volume and reflect or diffract light to create a virtual object array, wherein the virtual object array is disposed in a pre-determined virtual position located outside of said optically variable device at a distance spaced apart from the data-bearing volume, wherein the array of focusing elements provides a magnified view of said virtual object array, wherein when viewed from an observation point above the array of focusing elements, each of the array of focusing elements and the data-bearing volume is disposed between the virtual object array and the observation point, wherein between the array of focusing elements and the virtual object array, the optically variable device is devoid of images created by printing or surface relief, and wherein each virtual object in the virtual object array is disposed at a focal point of a corresponding focusing element of the array of focusing elements.

2. The optically variable device of claim 1, wherein the visual data elements contained within the data-bearing volume are created by interference effects of light waves.

3. The optically variable device of claim 2, wherein the data-bearing volume is a volume hologram.

4. The optically variable device of claim 2, wherein the data-bearing volume is a layer of liquid crystal material.

5. A security device comprising at least one optically variable device, said at least one optically variable device comprising:

an array of focusing elements combined with a data-bearing volume containing visual data elements, wherein said visual data elements are contained within said volume and reflect or diffract light to create a virtual object array, wherein the virtual object array is disposed in a pre-determined virtual position located outside of said optically variable device at a distance spaced apart from the data-bearing volume, wherein the array of focusing elements provides a magnified view of said virtual object array, wherein when viewed from an observation point above the array of focusing elements, each of the array of focusing elements and the data-bearing volume is disposed between the virtual object array and the observation point, wherein between the array of focusing elements and the virtual object array, said at least one optically variable device is devoid of images created by printing or surface relief, and wherein each virtual object in the virtual object array is disposed at a focal point of a corresponding focusing element of the array of focusing elements.

6. The security device of claim 5, wherein the array of focusing elements and the data-bearing volume are formed separately so that the magnified view of said virtual object array is provided only when said array of focusing elements and said volume are combined by a user.

7. An article comprising:

a surface; and at least one security device coupled to said surface in order to resist counterfeiting of said article, said security device including at least one optically variable device comprising:

an array of focusing elements combined with a data-bearing volume containing visual data elements, wherein said visual data elements are contained within said volume and reflect or diffract light to create a virtual object array, wherein the virtual object array is disposed in a pre-determined virtual position located outside of said optically variable device at a distance spaced apart from the data-bearing volume, wherein the array of focusing elements provides a magnified view of said virtual object array, wherein when viewed from an observation point above the array of focusing elements, each of the array of focusing elements and the data-bearing volume is disposed between the virtual object array and the observation point, wherein between the array of focusing elements and the virtual object array, said at least one optically variable device is devoid of images created by printing or surface relief, and wherein each virtual object in the virtual object array is disposed at a focal point of a corresponding focusing element of the array of focusing elements.

8. An article comprising:

a surface; and at least one security device associated with said article in order to resist counterfeiting of said article, said security device including at least one optically variable device comprising:

an array of focusing elements combined with a data-bearing volume containing visual data elements, wherein said visual data elements are contained within said volume and reflect or diffract light to create a virtual object array, wherein the virtual object array is disposed in a pre-determined virtual position located outside of said optically variable device at a distance spaced apart from the data-bearing volume, wherein the array of focusing elements provides a magnified view of said virtual object array, wherein when viewed from an observation point above the array of focusing elements, each of the array of focusing elements and the data-bearing volume is disposed between the virtual object array and the observation point, wherein between the array of focusing elements and the virtual object array, said at least one optically variable device is devoid of images created by printing or surface relief, and wherein each virtual object in the virtual object array is disposed at a focal point of a corresponding focusing element of the array of focusing elements, wherein the array of focusing elements and the data-bearing volume comprising the security device are formed separately, at least one of said array of focusing elements and said volume is coupled to said surface, and said magnified view of said virtual object array is provided only when said array of focusing elements and said volume are combined by a user.

9. A method of creating a security device having at least one optically variable device, the method comprising:

designing an object image;

forming a master for a focusing layer containing an array of focusing elements;

forming a master for an object layer including visual data elements, where the object layer is a data-bearing volume with substantially planar surfaces; and replicating said focusing layer and said object layer, wherein the visual data elements reflect or diffract light to create a virtual object array, wherein the virtual object array is disposed in a pre-determined virtual position located outside of said optically variable device at a distance spaced apart from the data-bearing volume, wherein the array of focusing elements provide at least one magnified visual representation of said virtual object array observed from a predetermined relative observation point when said replicated focusing layer is placed between the observer and said replicated object layer, wherein when viewed from an observation point above the array of focusing elements, each of the array of focusing elements and the data-bearing volume is disposed between the virtual object array and the observation point, wherein between the array of focusing elements and the virtual object array, said at least one optically variable device is devoid of images created by printing or surface relief, wherein each virtual object in the virtual object array is disposed at a focal point of a corresponding focusing element of the array of focusing elements, and wherein said visual data elements are contained within said volume.

10. The method of claim 9 further comprising laminating said focusing layer and said object layer on a first portion and a second portion, respectively, of a substrate.

11. The method of claim 9 further comprising laminating said object layer to a substrate, and laminating said focusing layer to said object layer.

12. The method of claim 9 further comprising creating said data elements by the interference of light waves.

* * * * *